(12) United States Patent
Kawaoka et al.

(10) Patent No.: US 9,336,744 B2
(45) Date of Patent: May 10, 2016

(54) INFORMATION PROCESSING APPARATUS AND CONTROL METHOD THEREOF

(71) Applicant: CANON KABUSHIKI KAISHA, Tokyo (JP)

(72) Inventors: Shigeo Kawaoka, Tokyo (JP); Akihiro Takamura, Kokubunji (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/275,986

(22) Filed: May 13, 2014

(65) Prior Publication Data

US 2014/0340530 A1 Nov. 20, 2014

(30) Foreign Application Priority Data

May 17, 2013 (JP) ................. 2013-105625

(51) Int. Cl.
*G09G 5/00* (2006.01)
*H04N 5/04* (2006.01)

(52) U.S. Cl.
CPC . *G09G 5/006* (2013.01); *H04N 5/04* (2013.01)

(58) Field of Classification Search
USPC .......................................... 348/194
See application file for complete search history.

(56) References Cited

U.S. PATENT DOCUMENTS 5,694,175 A * 12/1997 Gaigneux et al. ............. 348/558
6,171,190 B1 * 1/2001 Thanasack et al. ............. 463/51
6,348,931 B1 * 2/2002 Suga et al. .................... 345/699

FOREIGN PATENT DOCUMENTS

JP 2-006574 A 1/1990
JP 8-339174 A 12/1996

* cited by examiner

*Primary Examiner* — Michael Teitelbaum
(74) *Attorney, Agent, or Firm* — Carter, DeLuca, Farrell & Schmidt, LLP

(57) ABSTRACT

An information processing apparatus for determining polarity of a vertical synchronizing signal, in an effective state, included in a video signal measures a duration in which the vertical synchronizing signal maintains the same polarity, obtains the polarity of the vertical synchronizing signal when the measured duration exceeds a predetermined duration, and determines the polarity of the vertical synchronizing signal in the effective state based on the obtained polarity.

7 Claims, 9 Drawing Sheets

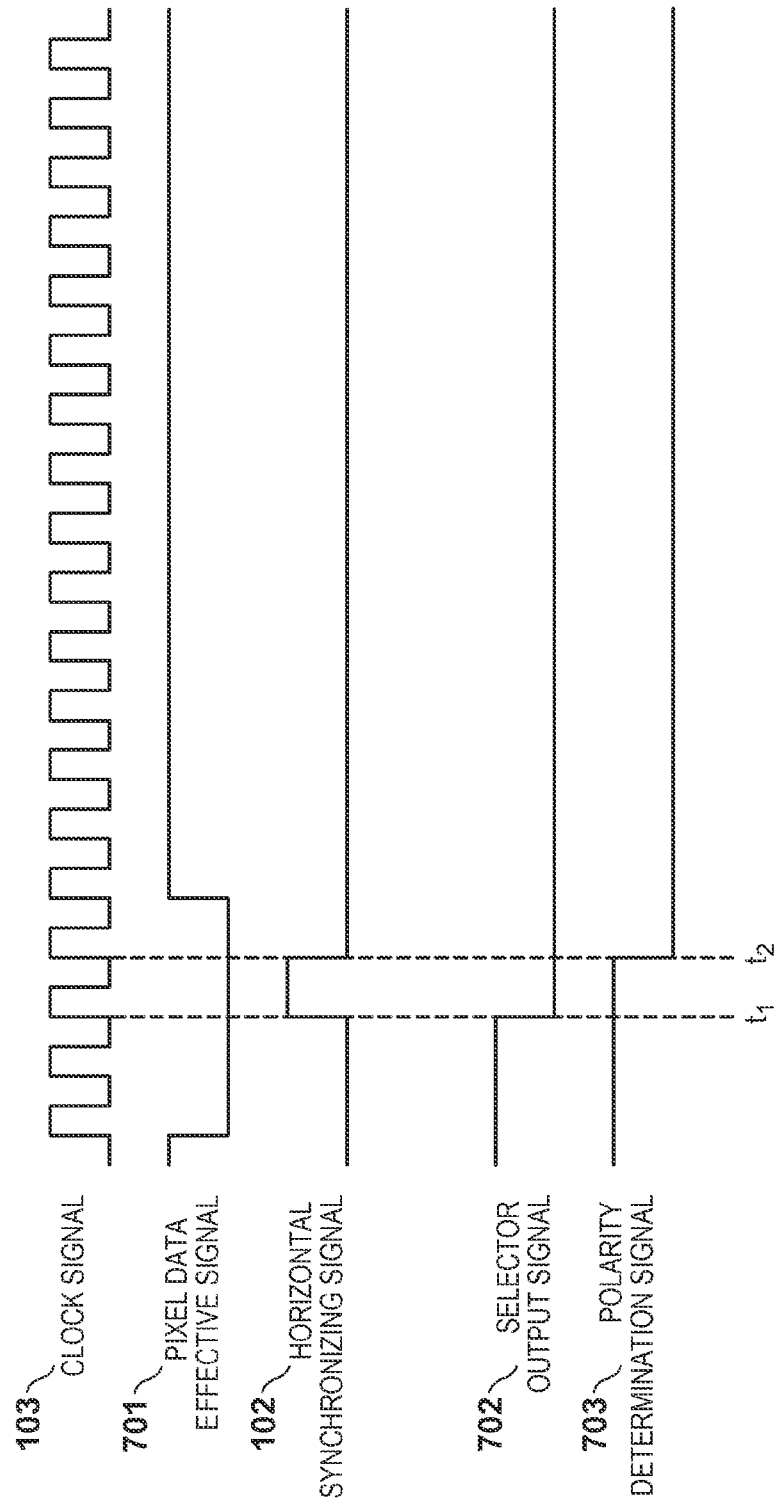

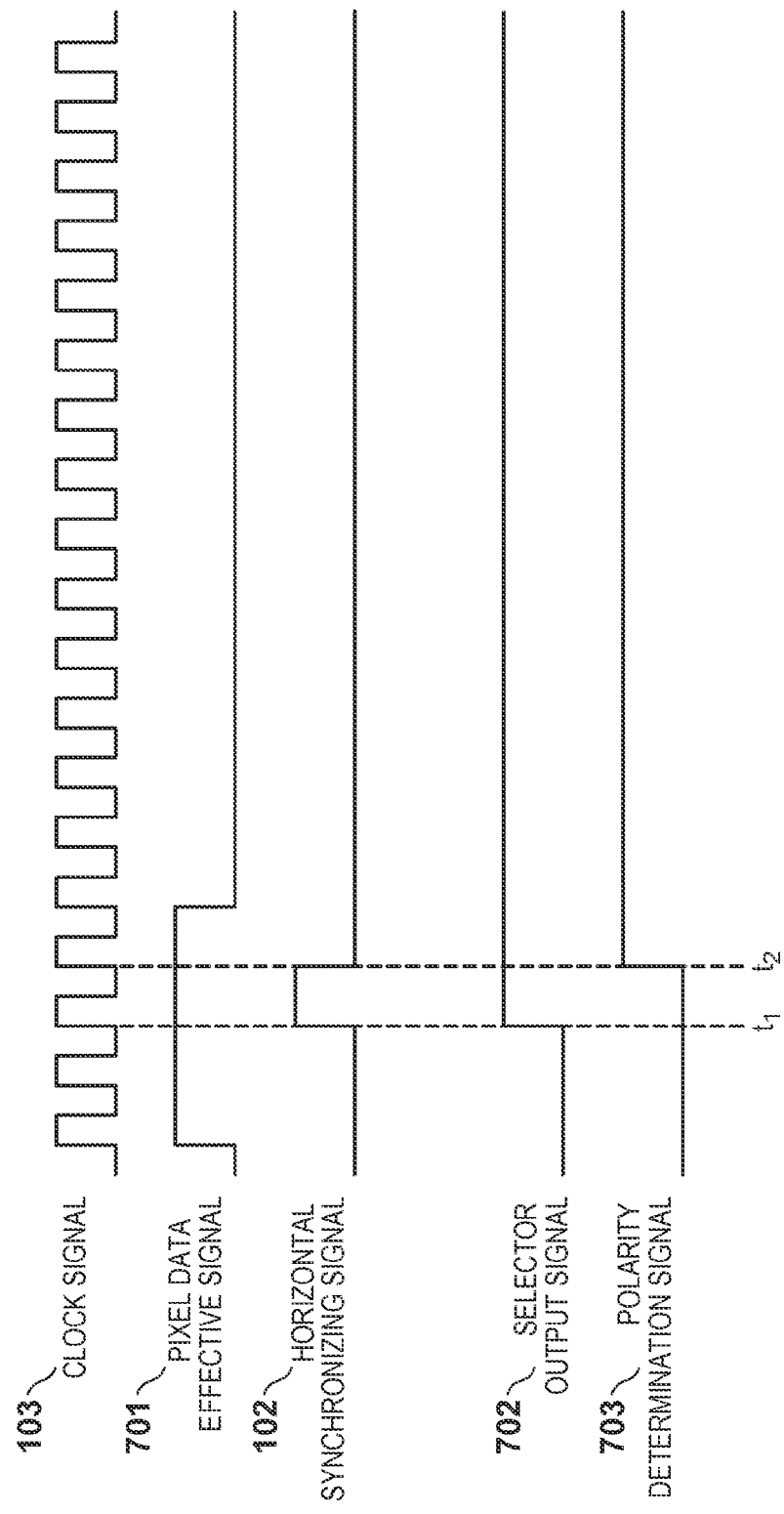

INFORMATION PROCESSING APPARATUS AND CONTROL METHOD THEREOF

BACKGROUND OF THE INVENTION

1. Field of the Invention

The present invention relates to a polarity detection technique of a video synchronizing signal that enables screen display.

2. Description of the Related Art

Apparatuses that determine the polarity of a video synchronizing signal have conventionally been proposed. For example, Japanese Patent Laid-Open No. 8-339174 (to be referred to as literature 1 hereinafter) proposes a method of counting the pulses of a horizontal synchronizing signal and comparing a counter value during the period of each polarity of a vertical synchronizing signal, thereby determining the polarity of the vertical synchronizing signal. Japanese Patent Laid-Open No. 2-6574 (to be referred to as literature 2 hereinafter) proposes a method of inputting a synchronizing signal into an integrating circuit and exclusive-ORing the integration result and the synchronizing signal, thereby deciding the synchronizing signal. Note that the proposal of literature 2 assumes that a signal of at least one period (at least one frame) is input to the integrating circuit.

When synchronizing a video signal by the method described in literature 1 or 2, a time of one frame is necessary to determine the polarity of the synchronizing signal of the video, and a long time is needed for screen display. There has also been proposed a method of, when determining the polarity of a synchronizing signal, hard-coding one of the polarities as the polarity of the synchronizing signal. In this method, when the polarity matches the hard-coded polarity, screen display can quickly be done. However, in case of an opposite polarity, a long time is necessary for screen display.

SUMMARY OF THE INVENTION

The present invention has been made to solve the above-described problems, and according to an aspect of the present invention, there are disclosed an information processing apparatus that shortens the time needed for polarity determination of a vertical synchronizing signal in a video signal and a control method thereof.

According to one aspect of the present invention, there is provided an information processing apparatus for determining polarity of a vertical synchronizing signal, in an effective state, included in a video signal, comprising: a measurement unit configured to measure a duration in which the vertical synchronizing signal maintains the same polarity; an obtainment unit configured to obtain the polarity of the vertical synchronizing signal when the duration measured by the measurement unit exceeds a predetermined duration; and a determination unit configured to determine the polarity of the vertical synchronizing signal in the effective state based on the polarity obtained by the obtainment unit.

According to another aspect of the present invention, there is provided a control method of an information processing apparatus for determining polarity of a vertical synchronizing signal, in an effective state, included in a video signal, the method comprising: a measurement step of measuring a duration in which the vertical synchronizing signal maintains the same polarity; an obtainment step of obtaining the polarity of the vertical synchronizing signal when the duration measured in the measurement step exceeds a predetermined duration; and a determination step of determining the polarity of the vertical synchronizing signal in the effective state based on the polarity obtained in the obtainment step.

According to another aspect of the present invention, there is provided an information processing apparatus for determining polarity of a data effective signal, in an effective state, in a video signal, comprising: an obtainment unit configured to obtain the polarity of the data effective signal in the effective state of a horizontal synchronizing signal included in the video signal; and a determination unit configured to determine the polarity of the data effective signal in the effective state based on the polarity obtained by the obtainment unit.

Furthermore, according to another aspect of the present invention, there is provided a control method of an information processing apparatus for determining polarity of a data effective signal, in an effective state, in a video signal, the method comprising: an obtainment step of obtaining the polarity of the data effective signal in the effective state of a horizontal synchronizing signal included in the video signal; and a determination step of determining the polarity of the data effective signal in the effective state based on the polarity obtained in the obtainment step.

Further features of the present invention will become apparent from the following description of exemplary embodiments with reference to the attached drawings.

BRIEF DESCRIPTION OF THE DRAWINGS

FIG. 8 is a timing chart for explaining the operation of the polarity determination apparatus according to the second embodiment; and FIG. 9 is a timing chart for explaining the operation of the polarity determination apparatus according to the second embodiment.

DESCRIPTION OF THE EMBODIMENTS

Preferred embodiments of the present invention will now be described in detail with reference to the accompanying drawings. Note that the constituent elements described in the embodiments below are merely examples, and the present invention is not limited by the illustrated arrangements.

<First Embodiment>

Figure 1:
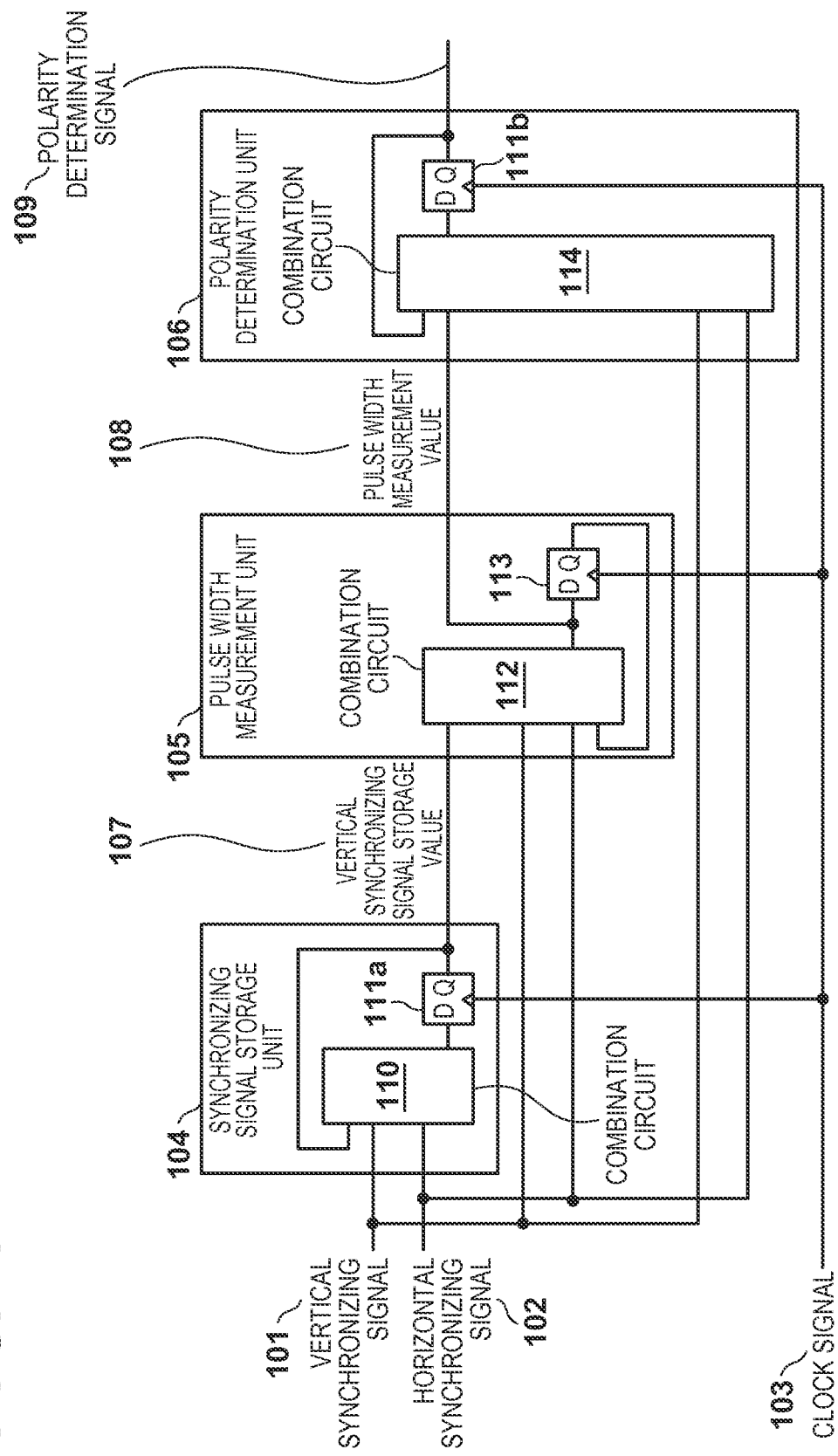
FIG. 1 is a block diagram showing the arrangement of a polarity determination apparatus according to the first embodiment.

FIG. 1 is a block diagram showing the arrangement of a polarity determination apparatus according to the first embodiment, which determines whether the polarity of a vertical synchronizing signal, in an effective state, included in a video signal is positive or negative (active high or active low). As shown in FIG. 1, the polarity determination apparatus according to this embodiment includes a synchronizing signal storage unit 104, a pulse width measurement unit 105, and a polarity determination unit 106 and controls polarity determination of a vertical synchronizing signal. In the polarity determination apparatus according to the first embodiment, the synchronizing signal storage unit 104 and the pulse width measurement unit 105 measure the duration in which a vertical synchronizing signal maintains the same polarity. The polarity determination unit 106 obtains the polarity of the vertical synchronizing signal when the duration measured by the pulse width measurement unit 105 has exceeded a predetermined duration, and determines the polarity of the vertical synchronizing signal in an effective state. An example of the arrangement and operation of the polarity determination apparatus that implements such processing will be described below in detail.

As shown in FIG. 1, the polarity determination apparatus of this embodiment receives a vertical synchronizing signal 101, a horizontal synchronizing signal 102, and a clock signal 103. In this embodiment, the clock signal 103 is used as a timing signal. Note that in this embodiment, whether the horizontal synchronizing signal 102 is active high or active low is assumed to be predetermined, and a description will be made hereafter assuming that the horizontal synchronizing signal 102 is active high.

The synchronizing signal storage unit 104 includes a combination circuit 110 and a flip-flop 111a. The synchronizing signal storage unit 104 stores the value of the vertical synchronizing signal 101 corresponding to the immediately preceding period of the clock signal 103. A stored vertical synchronizing signal storage value 107 is input from the flip-flop 111a to the pulse width measurement unit 105 at the rise timing of the clock signal 103.

The pulse width measurement unit 105 is formed from a combination circuit 112 and a 4-bit register 113. The pulse width measurement unit 105 measures the elapsed time of a state in which the vertical synchronizing signal maintains the same value, and transmits the measured value (pulse width measurement value 108) to the polarity determination unit 106. In this embodiment, the pulse width measurement value 108 indicates a value decremented from an initial value, as will be described later. Note that the initial value corresponds to a predetermined period longer than the width of an effective pulse of the vertical synchronizing signal and shorter than the period of the vertical synchronizing signal.

The polarity determination unit 106 includes a combination circuit 114 and a flip-flop 111b. The polarity determination unit 106 receives the pulse width measurement value 108 from the pulse width measurement unit 105 and outputs a polarity determination signal 109. If the pulse width measurement value 108 is 0, and the vertical synchronizing signal 101 is 1, the polarity determination unit 106 determines that the vertical synchronizing signal 101 has negative polarity. If the pulse width measurement value 108 is 0, and the vertical synchronizing signal 101 is 0, the polarity determination unit 106 determines that the vertical synchronizing signal 101 has positive polarity. That is, when the value of the vertical synchronizing signal that continues for a predetermined period is "1", the polarity is determined as negative. When the value is "0", the polarity is determined as positive.

Figure 2:
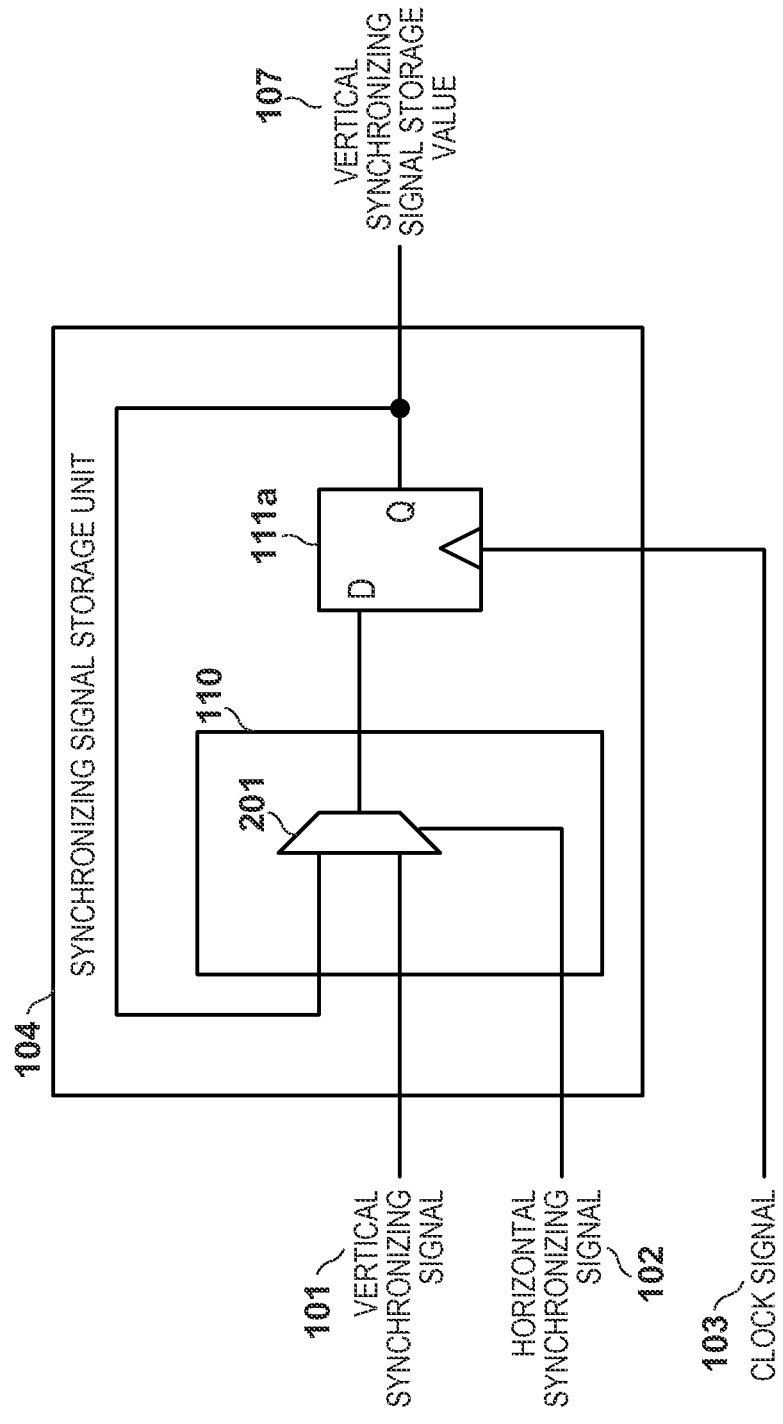
FIG. 2 is a circuit diagram showing the internal arrangement of a synchronizing signal storage unit according to the first embodiment.

FIG. 2 is a circuit diagram showing an example of the detailed arrangement of the synchronizing signal storage unit 104 according to the first embodiment. The synchronizing signal storage unit 104 shown in FIG. 2 includes a selector 201 serving as the combination circuit 110, and the flip-flop 111a. The synchronizing signal storage unit 104 receives the vertical synchronizing signal 101, the horizontal synchronizing signal 102, and the clock signal 103, and outputs the vertical synchronizing signal storage value 107. When the horizontal synchronizing signal 102 is 1, the selector 201 outputs the vertical synchronizing signal 101. When the horizontal synchronizing signal 102 is 0, the selector 201 outputs the value output from the flip-flop 111a. The flip-flop 111a transfers the output signal of the selector 201 from an input D to an output Q and outputs the vertical synchronizing signal storage value 107 at the rise timing of the clock signal 103.

Figure 3:
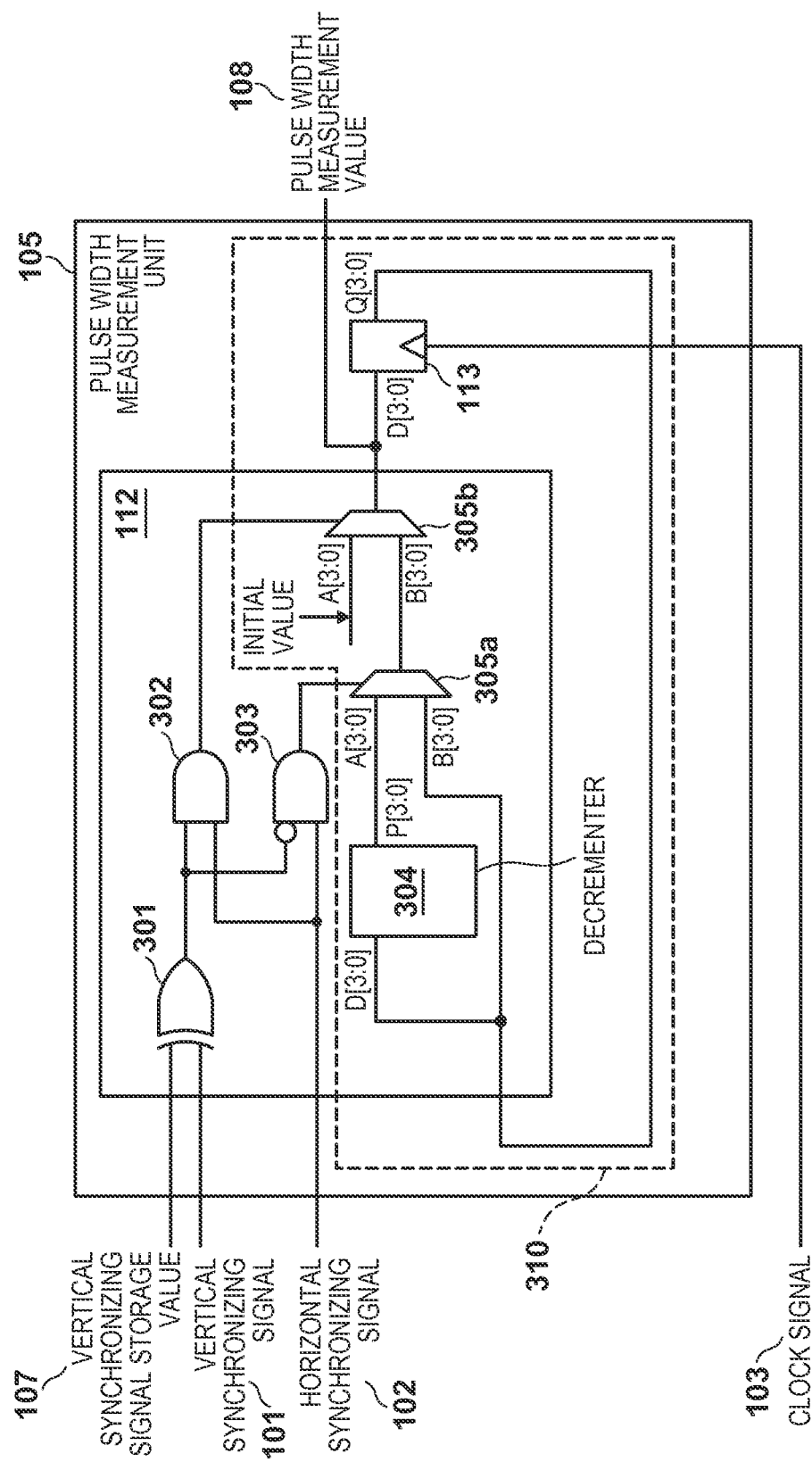
FIG. 3 is a circuit diagram showing the internal arrangement of a pulse width measurement unit according to the first embodiment.

FIG. 3 is a circuit diagram showing an example of the arrangement of the pulse width measurement unit 105 according to the first embodiment. The pulse width measurement unit 105 includes gates 301, 302, and 303, a decrementer 304, selectors 305a and 305b, and the 4-bit register 113. The decrementer 304, the selectors 305a and 305b, and the 4-bit register 113 constitute a down counter 310.

The pulse width measurement unit 105 receives the vertical synchronizing signal 101, the horizontal synchronizing signal 102, the clock signal 103, and the vertical synchronizing signal storage value 107, and outputs the pulse width measurement value 108. In this embodiment, the pulse width measurement unit 105 outputs the pulse width measurement value 108 as a 0-bit logical value. Note that the output method of the pulse width measurement value 108 is not limited to a method to be described below, and the pulse width measurement value 108 may be output by another method.

The gate 301 outputs the exclusive OR of the vertical synchronizing signal storage value 107 and the vertical synchronizing signal 101. The gate 302 outputs the AND of the output signal of the gate 301 and the horizontal synchronizing signal 102. The gate 303 outputs the AND of an inverted signal of the output signal of the gate 301 and the horizontal synchronizing signal 102.

When the signal output from the gate 302 is 1, the selector 305b outputs an initial value preset in the pulse width measurement unit 105. When the signal output from the gate 302 is 0, the selector 305b outputs the signal output from the selector 305a.

The 4-bit register 113 transfers the signal output from the selector 305b from the input D to the output Q at the rise timing of the clock signal 103. The decrementer 304 decrements the logical value transmitted from the 4-bit register 113 by one, and outputs the decrement result to an output P. When the signal output from the gate 303 is 1, the selector 305a outputs the signal transmitted from the decrementer 304. When the signal output from the gate 303 is 0, the selector 305a outputs the signal transmitted from the 4-bit register 113.

That is, the down counter 310 constituted by the decrementer 304, the selectors 305a and 305b, and the 4-bit register 113 decrements the initial value input from the selector 305b, and outputs the result (counter value) from the selector 305b.

In the above-described way, the pulse width measurement unit 105 sets the counter value of the down counter 310 to the initial value when the polarity of the vertical synchronizing signal 101 changes, and decrements the counter value when the vertical synchronizing signal 101 remains the same. This makes it possible to measure whether a state in which the vertical synchronizing signal 101 maintains the same value continues for a predetermined period or more (determine whether a period in which the value of the vertical synchronizing signal 101 is maintained exceeds a predetermined time). The pulse width measurement unit 105 outputs, as the pulse width measurement value 108, the counter value output from the selector 305b.

Figure 4:
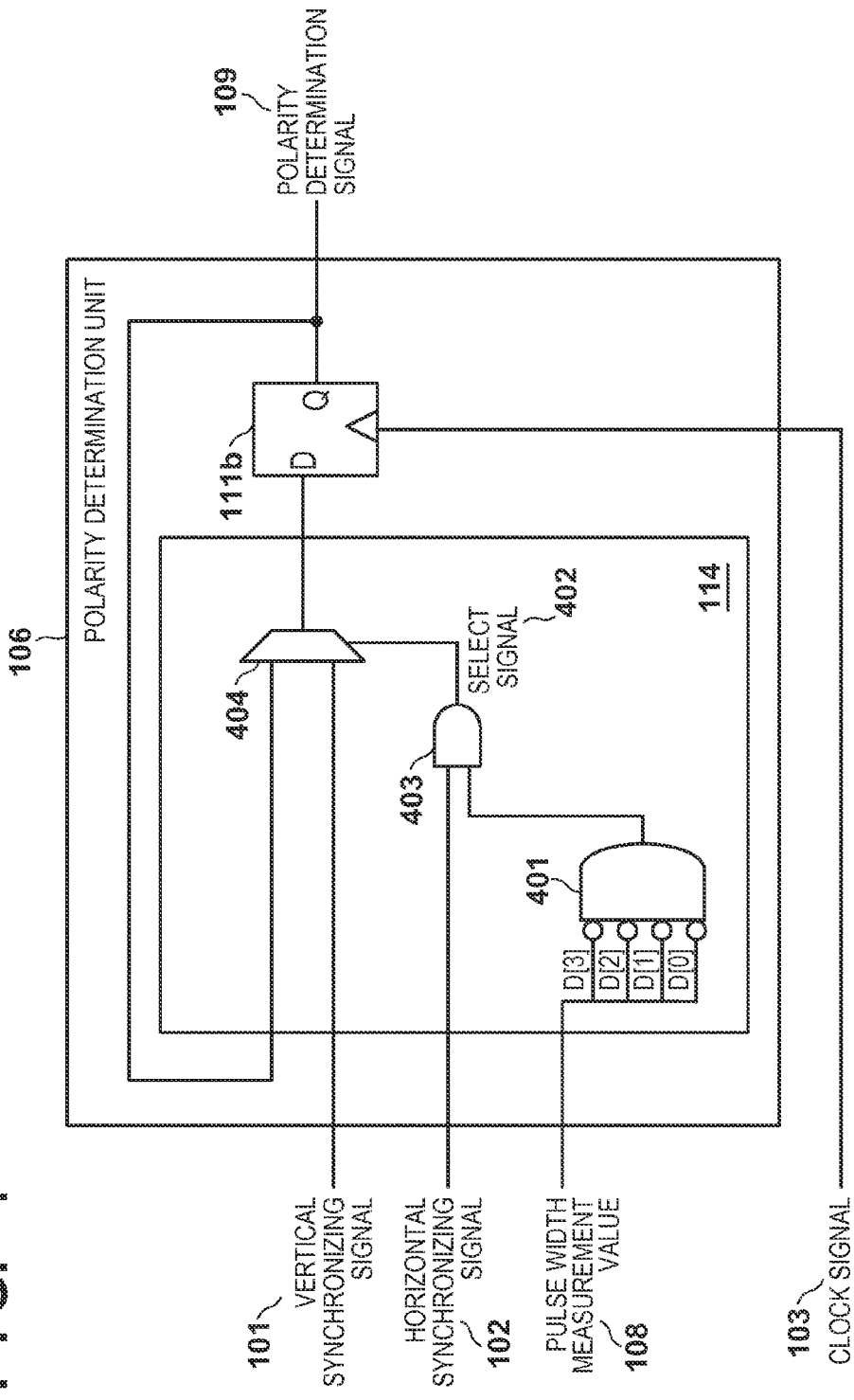
FIG. 4 is a circuit diagram showing the internal arrangement of a polarity determination unit according to the first embodiment.

FIG. 4 is a circuit diagram showing an example of the arrangement of the polarity determination unit 106 according to this embodiment. The polarity determination unit 106 shown in FIG. 4 includes a selector 404, gates 401 and 403, and the flip-flop 111b. The polarity determination unit 106 receives the vertical synchronizing signal 101, the horizontal synchronizing signal 102, the clock signal 103, and the pulse width measurement value 108, and outputs the polarity determination signal 109. Note that the arrangement of the polarity determination unit 106 is not limited to this embodiment, and another arrangement may be employed.

The gate 401 receives a value including inverted values of the respective bits of the pulse width measurement value 108, and outputs the AND of these values. The gate 403 receives the horizontal synchronizing signal 102 and the output signal of the gate 401, and outputs the AND of the signals to the selector 404 as a select signal 402. The selector 404 receives the vertical synchronizing signal 101, the output signal of the flip-flop 111b, and the select signal 402, and outputs the vertical synchronizing signal 101 when the select signal 402 is 1. When the select signal 402 is 0, the selector 404 outputs the value of the output Q of the flip-flop 111b.

The flip-flop 111b transfers the signal transmitted from the selector 201 from the input D to the output Q, and outputs it as the polarity determination signal 109 at the rise timing of the clock signal 103. More specifically, when the pulse width measurement value 108 (counter value) is 0, and the vertical synchronizing signal 101 is 1, the polarity determination unit 106 determines that the vertical synchronizing signal 101 has negative polarity. When the pulse width measurement value 108 is 0, and the vertical synchronizing signal 101 is 0, the polarity determination unit 106 determines that the vertical synchronizing signal 101 has positive polarity.

Note that in this embodiment, a method of determining the polarity of the vertical synchronizing signal 101 when the counter value has reached 0 has been described. However, the present invention is not limited to this. For example, if the length of the effective period is known, the polarity of the vertical synchronizing signal may be determined by detecting the value of the vertical synchronizing signal 101 when the counter value has become smaller than the minimum value of the value counted during the effective period of the vertical synchronizing signal 101.

Figure 5:
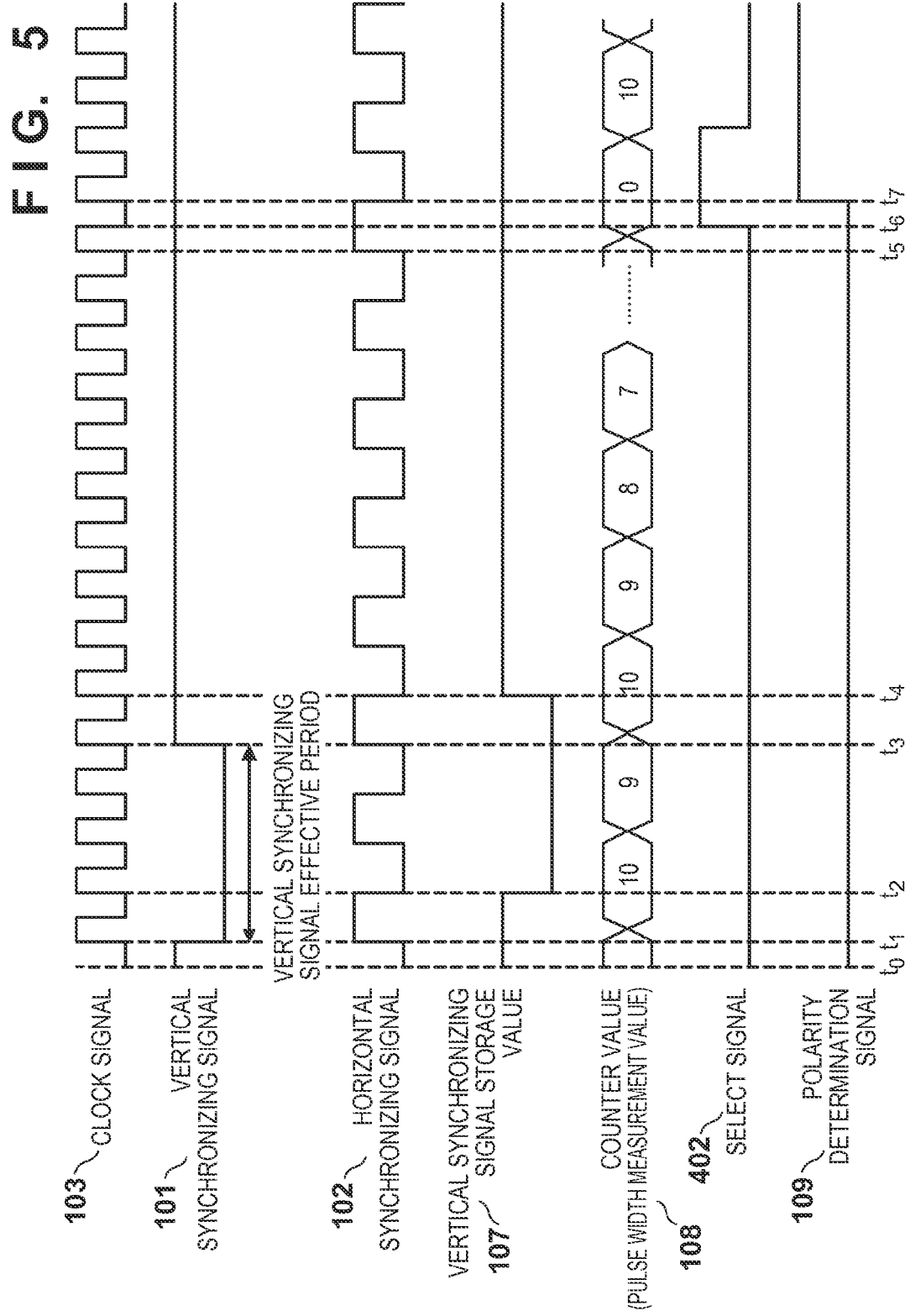
FIG. 5 is a timing chart for explaining the operation of the polarity determination apparatus according to the first embodiment.

FIG. 5 is a timing chart showing the operation of the polarity determination apparatus shown in FIG. 1. FIG. 5 shows the operation of the polarity determination apparatus shown in FIG. 1 in determining the polarity of the vertical synchronizing signal when the vertical synchronizing signal 101 has negative polarity. The effective period of the vertical synchronizing signal 101 is the period from time t1 to time t3. The operation of the apparatus shown in FIG. 1 will be described below with reference to FIGS. 1 to 5.

For example, a case where the initial value set in the pulse width measurement unit 105 is 1010 (binary number) will be described below. The initial value corresponds to 10 in decimal number. Note that as for the duration when the down counter 310 counts the counter value from the initial value to 0, a counter value corresponding to a time longer than the width of the effective pulse of the vertical synchronizing signal and shorter than the period of the vertical synchronizing signal is set as the initial value. Hence, the initial value need not be 10, and can be any value capable of preventing the counter value from becoming 0 during the effective period of the vertical synchronizing signal 101 and also preventing the time to determine the polarity of the vertical synchronizing signal 101 from becoming too long. The bit width of the counter value counted inside the pulse width measurement unit 105 is set to not less than a bit width capable of setting the initial value.

The value of the clock signal 103 input to the apparatus shown in FIG. 1 changes at a predetermined period. The value of the horizontal synchronizing signal 102 changes at the rise timing of the clock signal. Note that FIG. 5 illustrates a horizontal synchronizing signal that has a duty ratio of 50% and switches between 1 and 0 every time the clock signal 103 rises, for the descriptive convenience. In fact, however, only one pulse of the horizontal synchronizing signal is generated every time a predetermined number of (a plurality of) clock signals 103 are input. At time t0, the clock signal 103 is 0, the vertical synchronizing signal 101 is 1, the horizontal synchronizing signal 102 is 0, and the vertical synchronizing signal storage value 107 is 1. At time t1, the vertical synchronizing signal 101 changes to 0, and the horizontal synchronizing signal 102 changes to 1. At this time, the outputs of the gates 301 and 302 of the pulse width measurement unit 105 (FIG. 3) change to 1, and the output of the gate 303 changes to 0. After that, the initial value 10 is set in the register 113 included in the down counter.

At time t2, the vertical synchronizing signal storage value 107 of the synchronizing signal storage unit 104 (FIG. 2) changes to 0. At this time, the outputs of the gates 301 and 302 in FIG. 3 change to 0, and the output of the gate 303 changes to 1. Hereafter, the output of the gate 303 changes to 1/0 in accordance with the 1/0 change of the horizontal synchronizing signal 102. Hence, the counter value is decremented by the decrementer 304 every time the horizontal synchronizing signal 102 changes to 1.

At time t3, the vertical synchronizing signal 101 changes to 1, the outputs of the gates 301 and 302 in FIG. 3 change to 1, and the output of the gate 303 changes to 0. For this reason, the initial value 10 is set in the register 113 again before the counter value of the down counter 310 reaches 0. At time t4, the outputs of the gates 301 and 302 in FIG. 3 change to 0, and the output of the gate 303 changes to 1. Hereafter, every time the horizontal synchronizing signal 102 changes to 1, the output of the gate 303 changes to 1, and the decrementer 304 decrements the counter value.

During the period from time t4 to time t5, the value of the vertical synchronizing signal 101 remains 1. Hence, the outputs of the gates 301 and 302 in FIG. 3 are 0, and the output of the gate 303 is 1. The output of the gate 303 changes to 1 every time the horizontal synchronizing signal 102 changes to 1. Hence, every time the horizontal synchronizing signal 102 changes to 1, the counter value is decremented. In the above-described manner, when the polarity of the vertical synchronizing signal switches, the initial value is set in the down counter 310. Every time the horizontal synchronizing signal is detected, the counter value is decremented from the initial value.

At time t6, the counter value becomes 0, and the output signal of the gate 401 changes to 1. The select signal 402 changes to 1, and the vertical synchronizing signal 101 is output from the selector 404 of the polarity determination unit 106 (FIG. 4). At time t7, the vertical synchronizing signal 101 is transferred from the input D to the output Q of the flip-flop 111b in FIG. 4 at the rise timing of the clock signal 103. At this time, the polarity determination signal 109 changes to 1, and the polarity of the vertical synchronizing signal 101 is determined as negative (active low).

Figure 6:
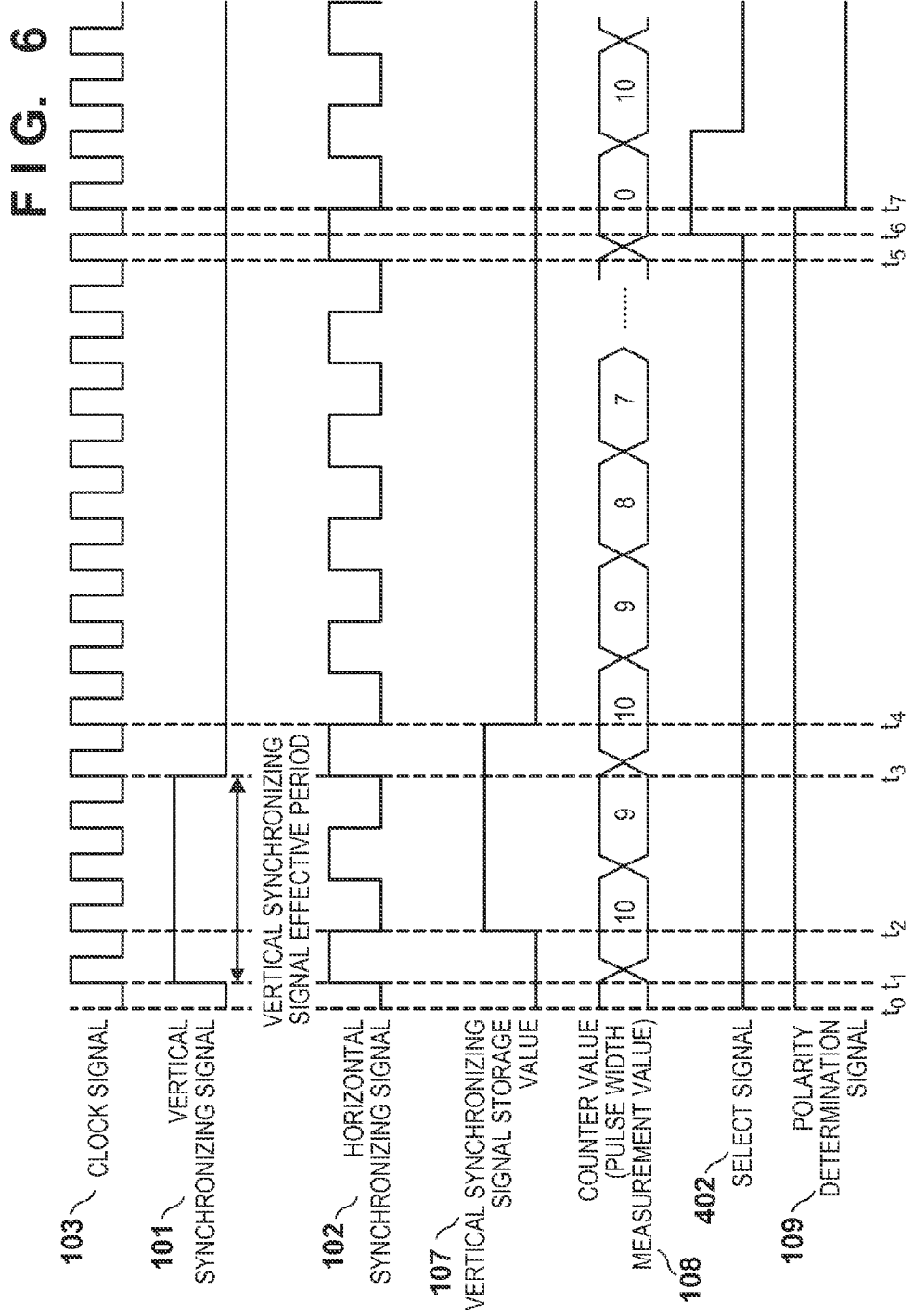
FIG. 6 is a timing chart for explaining the operation of the polarity determination apparatus according to the first embodiment.

The operation of the polarity determination apparatus when determining the vertical synchronizing signal 101 as negative has been described above with reference to FIG. 5. The operation of the polarity determination apparatus when determining the vertical synchronizing signal 101 as positive polarity will be described next. FIG. 6 shows the operation of the polarity determination apparatus according to this embodiment in determining the polarity of the vertical synchronizing signal when the vertical synchronizing signal 101 has positive polarity. The effective period of the vertical synchronizing signal 101 is the period from time t1 to time t3. The operation of the apparatus shown in FIG. 1 will be described below with reference to FIGS. 1 to 4 and 6.

A case where the initial value set in the down counter is 10 (decimal number) will be described below, like the description using FIG. 5. As in FIG. 5, the value of the clock signal 103 input to the apparatus shown in FIG. 1 changes at a predetermined period, and the value of the horizontal synchronizing signal 102 changes at the rise timing of the clock signal.

At time t0, the clock signal 103 is 0, the vertical synchronizing signal 101 is 0, the horizontal synchronizing signal 102 is 0, and the vertical synchronizing signal storage value 107 is 0. At time t1, the vertical synchronizing signal 101 changes to 1, and the horizontal synchronizing signal 102 changes to 1. At this time, the outputs of the gates 301 and 302 of the pulse width measurement unit 105 (FIG. 3) change to 1, and the output of the gate 303 changes to 0. After that, the initial value 10 is set in the down counter.

At time t2, the vertical synchronizing signal storage value 107 in FIG. 2 changes to 1. At this time, the outputs of the gates 301 and 302 in FIG. 3 change to 0, and the output of the gate 303 changes to 1. Hereafter, the output of the gate 303 changes to 1 every time the horizontal synchronizing signal 102 changes to 1. Hence, the counter value is decremented every time the horizontal synchronizing signal 102 changes to 1.

At time t3, the vertical synchronizing signal 101 changes to 0, the outputs of the gates 301 and 302 in FIG. 3 change to 1, and the output of the gate 303 changes to 0. After that, the initial value 10 is set in the register 113. At time t4, the outputs of the gates 301 and 302 in FIG. 3 change to 0, and the output of the gate 303 changes to 1. Hereafter, every time the horizontal synchronizing signal 102 changes to 1, the output of the gate 303 changes to 1, and the decrementer 304 decrements the counter value.

That is, during the period from time t4 to time t5, the value of the vertical synchronizing signal 101 remains 0. Hence, the outputs of the gates 301 and 302 in FIG. 3 are 0, and the output of the gate 303 is 1. The output of the gate 303 changes to 1 every time the horizontal synchronizing signal 102 changes to 1. Hence, every time the horizontal synchronizing signal 102 changes to 1, the counter value is decremented.

At time t6, the counter value becomes 0, and the output signal of the gate 401 of the polarity determination unit 106 (FIG. 4) changes to 1. The select signal 402 changes to 1, and the vertical synchronizing signal 101 is output from the selector 201. At time t7, the vertical synchronizing signal 101 is transferred from the input D to the output Q of the flip-flop 111b at the rise timing of the clock signal 103. At this time, the polarity determination signal 109 changes to 0, and the polarity of the vertical synchronizing signal 101 is determined as positive (active high).

As described above in detail, according to the video synchronizing signal polarity determination apparatus according to the first embodiment, the time needed to determine the polarity of the vertical synchronizing signal out of the video synchronizing signal is shortened, and screen display can start in a short time.

Note that in this embodiment, a method of decrementing the counter value of the pulse width measurement unit 105 has been described. However, a method of incrementing the counter value may be used. In this case, the polarity determination unit 106 determines the polarity from the value of the vertical synchronizing signal when the counter value reaches a value corresponding to a predetermined period longer than the width of an effective pulse of the vertical synchronizing signal and shorter than the period of the vertical synchronizing signal. For example, the polarity determination unit 106 can be a circuit that determines the polarity of the vertical synchronizing signal as positive when the counter value has become larger than the value corresponding to the predetermined period, and the value of the vertical synchronizing signal at that time is 0. In addition, the polarity determination unit 106 can be a circuit that determines the polarity of the vertical synchronizing signal as negative when the counter value has become larger than the value corresponding to the predetermined period, and the value of the vertical synchronizing signal at that time is 1. Alternatively, if the length of the effective period of the vertical synchronizing signal is known, the value of the vertical synchronizing signal may be confirmed when the counter value has become larger than the maximum value of the value counted during the effective period.

<Second Embodiment>

In the first embodiment, an arrangement that quickly determines the polarity of a vertical synchronizing signal, in an effective state, included in a video signal has been described. In the second embodiment, an arrangement that quickly determines the polarity of a data effective signal (pixel data effective signal), in an effective state, included in a video signal will be explained.

Figure 7:
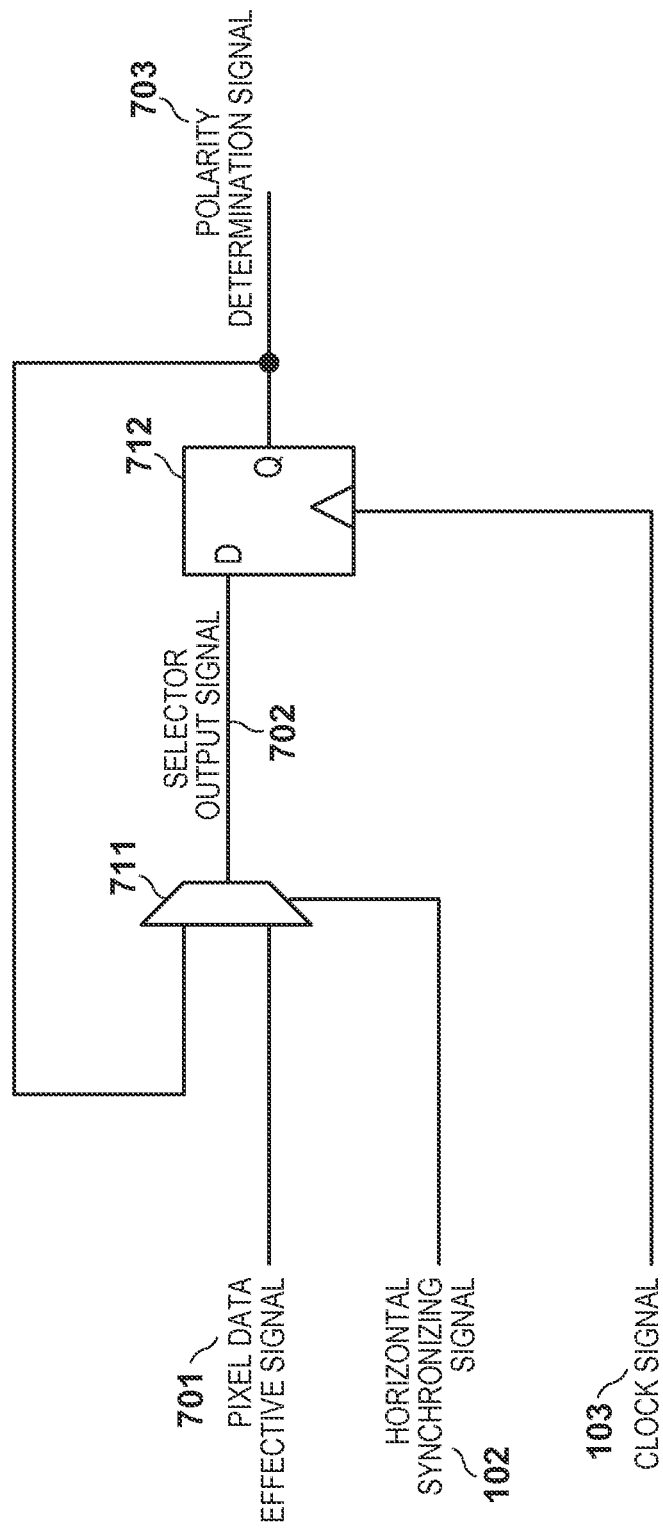
FIG. 7 is a block diagram showing the arrangement of a polarity determination apparatus according to the second embodiment.

FIG. 7 is a block diagram showing the arrangement of a polarity determination apparatus according to the second embodiment, which determines the polarity of a pixel data effective signal in an effective state. The circuit arrangement of the polarity determination apparatus according to the second embodiment is the same as that of a synchronizing signal storage unit 104 shown in FIG. 2. In the polarity determination apparatus shown in FIG. 7, the signal input to a selector 711 changes from the vertical synchronizing signal 101 to a pixel data effective signal 701. The remaining input signals are the same as in the synchronizing signal storage unit 104 shown in FIG. 2. Note that in the pixel data effective signal polarity determination apparatus according to this embodiment, whether a horizontal synchronizing signal 102 is active high or active low is assumed to be predetermined, as in the first embodiment. A description will be made hereafter assuming that the horizontal synchronizing signal 102 is active high.

The selector 711 receives the pixel data effective signal 701, the horizontal synchronizing signal 102, and the output signal of a flip-flop 712, and outputs the pixel data effective signal 701 when the horizontal synchronizing signal 102 is 1. When the horizontal synchronizing signal 102 is 0, the selector 711 outputs a polarity determination signal 703 of the pixel data effective signal. The flip-flop 712 transfers a selector output signal 702 from an input D to an output Q and outputs it as the polarity determination signal 703 of the pixel data effective signal at the rise timing of a clock signal 103.

FIG. 8 is a timing chart showing the operation of the polarity determination apparatus shown in FIG. 7. FIG. 8 shows the operation in performing polarity determination when the pixel data effective signal has negative polarity. The operation of the polarity determination apparatus shown in FIG. 7 will be described below with reference to FIG. 8.

The value of the clock signal 103 input to the polarity determination apparatus (FIG. 7) changes at a predetermined period. The value of the horizontal synchronizing signal 102 changes at the rise timing of the clock signal 103. Note that the horizontal synchronizing signal 102 is a pulse signal inserted every time a predetermined number of clock signals 103 are counted.

At time t1, the horizontal synchronizing signal 102 changes to 1. At this time, since the pixel data effective signal 701 is 0, the selector output signal 702 changes to 0. At time t2, at the rise timing of the clock signal 103, the selector output signal 702 is transferred from the input D to the output Q of the flip-flop 712, and the polarity determination signal 703 of the pixel data effective signal is output. At this time, the pixel data effective signal 701 is 0, and the polarity of the pixel data effective signal 701 is determined as negative.

A case where the pixel data effective signal has positive polarity will be described next. FIG. 9 is a timing chart showing the operation of the polarity determination apparatus according to this embodiment in performing polarity determination when the pixel data effective signal has positive polarity. The operation of the polarity determination apparatus shown in FIG. 7 will be described below with reference to FIG. 9. Note that in FIG. 9 as well, the value of the clock signal 103 input to the polarity determination apparatus changes at a predetermined period, and the value of the horizontal synchronizing signal 102 changes at the rise timing of the clock signal, as in FIG. 8.

At time t1, the horizontal synchronizing signal 102 changes to 1. At this time, since the pixel data effective signal 701 is 1, the selector output signal 702 changes to 1. At time t2, at the rise timing of the clock signal 103, the selector output signal 702 is transferred from the input D to the output Q of the flip-flop 712, and the polarity determination signal 703 of the pixel data effective signal is output. At this time, the polarity determination signal 703 is 1, and the polarity of the pixel data effective signal 701 is determined as positive.

Note that the pixel data effective signal polarity determination apparatus shown in FIG. 7 may obtain a determination result when the horizontal synchronizing signal changes. More specifically, when the horizontal synchronizing signal changes, and the pixel data effective signal is 0 at that time, the polarity in an effective state is determined as positive. When the pixel data effective signal is 1, the polarity in an effective state is determined as negative.

As described above in detail, according to the video synchronizing signal polarity determination apparatus according to this embodiment, the time needed to determine the polarity of the pixel data effective signal out of the video synchronizing signal is shortened, and screen display can start in a short time.

Note that some or all of the above-described functions may be implemented by causing a computer to execute a predetermined program.

Hence, the present invention is also implemented by executing the following processing. That is, software (program) for implementing the functions of the above-described embodiments is supplied to a system or apparatus via a network or various kinds of storage media, and the computer (or CPU or MPU) of the system or apparatus reads out and executes the program.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-105625, filed May 17, 2013, which is hereby incorporated by reference herein in its entirety.

What is claimed is:

1. An information processing apparatus for determining whether a vertical synchronizing signal included in a video signal is active low or active high, comprising:
    an obtainment unit configured to obtain a polarity of the vertical synchronizing signal;
    a change determination unit configured to determine at a predetermined time interval whether a change of polarity of the vertical synchronizing signal has occurred;
    a measurement unit configured to set an initial value in a counter when the polarity of the vertical synchronizing signal changes, and increment or decrement the value in the counter according to a detection of a horizontal synchronizing signal while the change of the polarity of the vertical synchronizing signal does not occur;
    a count determination unit configured to determine whether the value in the counter reaches a predetermined value; and
    a polarity determination unit configured to determine whether the vertical synchronizing signal is active low or active high based on the polarity of the vertical synchronizing signal obtained by the obtainment unit when the count determination unit determines that the value in the counter reaches the predetermined value.

2. The apparatus according to claim 1, wherein a duration corresponding to the predetermined value is longer than a width of an effective pulse of the vertical synchronizing signal and shorter than a period of the vertical synchronizing signal.

3. The apparatus according to claim 1, wherein the measurement unit decrements the value in the counter every time the horizontal synchronizing signal is detected and the change determination unit determines that the change of polarity does not occur,
    wherein the obtainment unit obtains the polarity of the vertical synchronizing signal when the value in the counter reaches 0, and
    wherein the initial value is the number of horizontal synchronizing signals corresponding to the predetermined value.

4. The apparatus according to claim 1, wherein the polarity determination unit determines that the vertical synchronizing signal is active low in a case where the polarity of the vertical synchronizing signal is 1, and determines that the vertical synchronizing signal is active high in a case where the polarity of the vertical synchronizing signal is 0.

5. A control method of an information processing apparatus for determining whether a vertical synchronizing signal included in a video signal is active low or active high, the method comprising:

obtaining a polarity of the vertical synchronizing signal;

determining at a predetermined time interval whether a change of polarity of the vertical synchronizing signal has occurred;

setting an initial value in a counter when the polarity of the vertical synchronizing signal changes, and increment or decrement the value in the counter according to a detection of a horizontal synchronizing signal while the change of the polarity of the vertical synchronizing signal does not occur;

determining whether the value in the counter reaches a predetermined value; and determining whether the vertical synchronizing signal is active low or active high based on the polarity of the vertical synchronizing signal which is obtained when the value in the counter reaches the predetermined value.

6. The method according to claim 5, wherein a duration corresponding to the predetermined value is longer than a width of an effective pulse of the vertical synchronizing signal and shorter than a period of the vertical synchronizing signal.

7. The method according to claim 5, wherein the value in the counter is decremented every time the horizontal synchronizing signal is detected and the change of polarity does not occur, wherein the polarity of the vertical synchronizing signal is obtained in the obtaining step when the value in the counter reaches 0, and wherein the initial value is the number of horizontal synchronizing signals corresponding to the predetermined value.

* * * * *